United States Patent
Meylan et al.

(10) Patent No.: US 9,351,331 B2
(45) Date of Patent: May 24, 2016

(54) INVASIVE SOCKET MANAGER

(71) Applicant: Qualcomm Incorporated, San Diego, CA (US)

(72) Inventors: Arnaud Meylan, San Diego, CA (US); Satashu Goel, San Diego, CA (US); David William Craig, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 323 days.

(21) Appl. No.: 13/756,800

(22) Filed: Feb. 1, 2013

(65) Prior Publication Data

US 2013/0282911 A1  Oct. 24, 2013

Related U.S. Application Data

(60) Provisional application No. 61/635,110, filed on Apr. 18, 2012.

(51) Int. Cl.
| | | |
|---|---|---|
| *G06F 15/16* | (2006.01) | |
| *H04W 76/06* | (2009.01) | |
| *H04L 29/06* | (2006.01) | |
| *G06F 11/00* | (2006.01) | |
| *H04L 12/28* | (2006.01) | |
| *H04W 4/20* | (2009.01) | |

(52) U.S. Cl.
CPC ............ *H04W 76/062* (2013.01); *H04L 69/162* (2013.01); *H04W 4/20* (2013.01); *H04W 76/064* (2013.01); *H04W 76/068* (2013.01)

(58) Field of Classification Search
CPC ............ H04W 76/062; H04W 76/064; H04W 76/068; H04W 4/20; H04L 69/162
USPC .............................. 709/227; 370/229, 395.52
See application file for complete search history.

(56) References Cited

U.S. PATENT DOCUMENTS

| 7,532,577 | B2* | 5/2009 | Park et al. ...................... 370/241 |
| 2002/0061002 | A1* | 5/2002 | Nitta .............................. 370/338 |
| 2004/0049596 | A1* | 3/2004 | Schuehler et al. ............ 709/238 |
| 2004/0162061 | A1 | 8/2004 | Abrol et al. |
| 2008/0263170 | A1* | 10/2008 | Caron et al. .................. 709/207 |
| 2009/0135731 | A1 | 5/2009 | Secades et al. |
| 2010/0099421 | A1* | 4/2010 | Patel et al. .................... 455/450 |
| 2010/0274922 | A1 | 10/2010 | Reavely |
| 2012/0163167 | A1* | 6/2012 | Dade ............................. 370/229 |
| 2012/0179744 | A1 | 7/2012 | Sullivan et al. |
| 2012/0230329 | A1 | 9/2012 | Morris |
| 2013/0024523 | A1* | 1/2013 | Albasheir et al. ............. 709/206 |

OTHER PUBLICATIONS

International Search Report and Written Opinion—PCT/US2013/037025—ISA/EPO—Oct. 9, 2013.
Nokia: "TLS versus IPsec for HTTP security", 3GPP Draft; S3-020666 Nokia-TLS_IPSEC_HTTP, 3rd Generation Partnership Project (3GPP), Mobile Competence Centre; 650, Route Des Lucioles; F-06921 Sophia-Antipolis Cedex; France, vol. SA WG3, No. Oxford; 20021120, Nov. 20, 2002, XP050273052, [retrieved on Nov. 20, 2002] paragraph [02.2].

* cited by examiner

*Primary Examiner* — Wen-Tai Lin (57) ABSTRACT

A server initiating shut down of a transport control protocol (TCP) connection when a radio connection is terminated is problematic because a new radio connection must be established for the sole purpose of shutting down the TCP connection. Hence, network and terminal resources for establishing the radio connection are wasted. Accordingly, a method, an apparatus, and a computer program product for initiating a closing of a transport layer connection at a client are provided. The apparatus determines whether a functionality associated with the transport layer connection satisfies at least one criterion, and closes the transport layer connection when the functionality satisfies the at least one criterion while a radio layer connection is available. As a result, the TCP connection is shut down by the client before the server can activate a new radio connection for the sole purpose of terminating the TCP connection.

28 Claims, 9 Drawing Sheets

INVASIVE SOCKET MANAGER

CROSS-REFERENCE TO RELATED APPLICATION(S)

This application claims the benefit of U.S. Provisional Application Ser. No. 61/635,110, entitled "INVASIVE SOCKET MANAGER" and filed on Apr. 18, 2012, which is expressly incorporated by reference herein in its entirety.

BACKGROUND

1. Field

The present disclosure relates generally to communication systems, and more particularly, to initiating closure of a transport layer connection at a client.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband code division multiple access (W-CDMA) systems, time division multiple access (TDMA) systems, frequency division multiple access (TDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide common protocols that enable different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and integrating better with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

After a transport layer connection is created between a mobile terminal and a server, and after traffic is exchanged between the two, the server may decide to shut down the transport layer connection. However, the server may decide to terminate the transport layer connection when a radio connection linking the server to the mobile terminal is already terminated. Hence, a new radio connection must be established for the sole purpose of transporting signaling meant for tearing down the transport layer connection. This wastes network and radio resources. Accordingly, a mechanism is provided for protecting the network and the mobile terminal in case applications repeatedly close connections untimely at a high cost to an operator.

In an aspect of the disclosure, for various applications running on a particular device (e.g., mobile terminal), it may be determined at run time which applications fail to timely close their transport layer connection. Thereafter, early closure of the transport layer connection on their behalf may be initiated.

In a further aspect of the disclosure, a method, an apparatus, and a computer program product for initiating a closing of a transport layer connection at a client is provided. The apparatus determines whether a functionality associated with the transport layer connection satisfies at least one criterion, and closes the transport layer connection when the functionality satisfies the at least one criterion while a radio layer connection is available. As a result, the transport layer connection is shut down by the client before the server can activate a new radio connection for the sole purpose of terminating the transport layer connection. Hence, network and terminal resources previously used for establishing the new radio connection are no longer wasted.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods.

These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
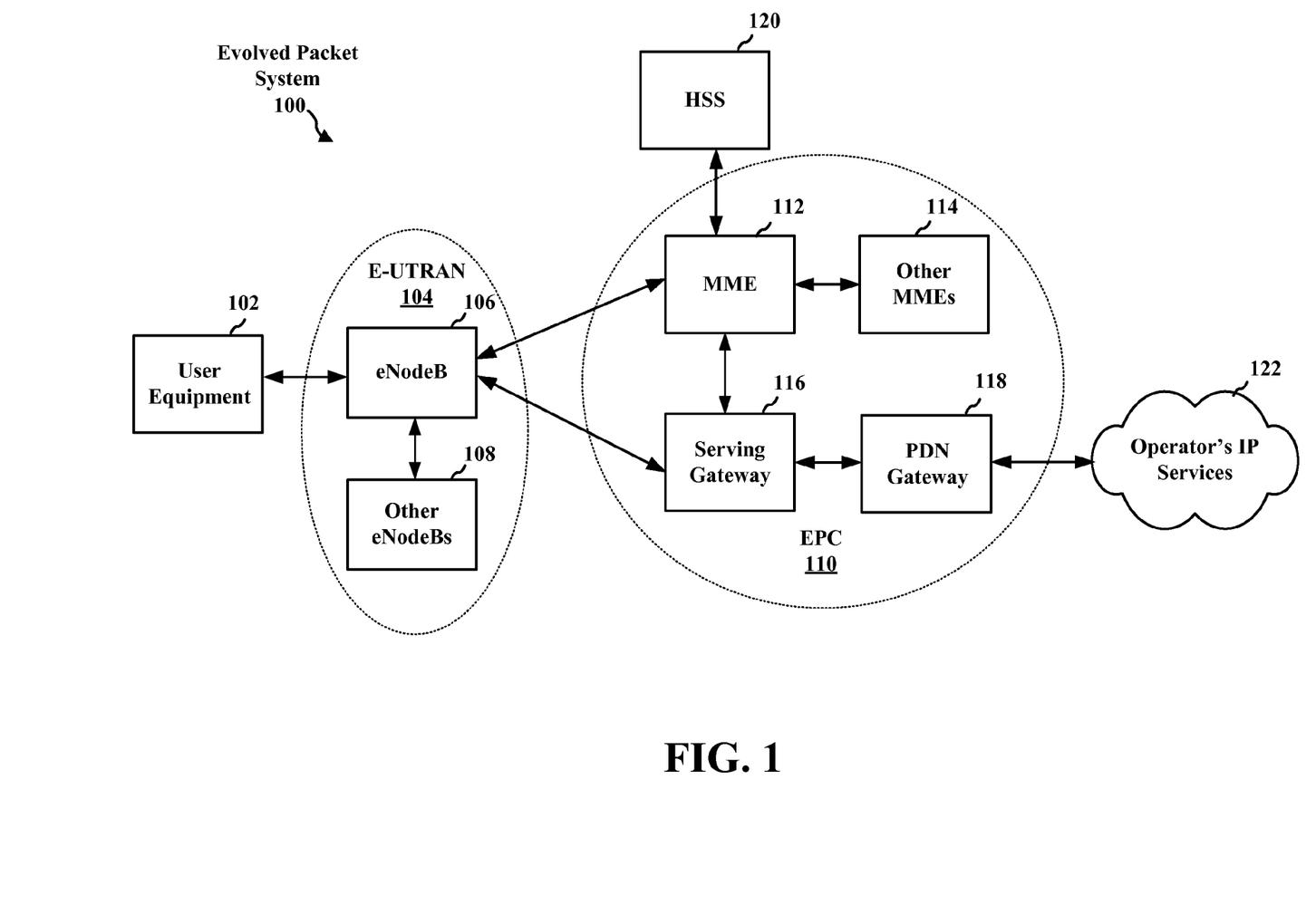
FIG. 1 is a diagram illustrating an example of a network architecture.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS). In the description above and below, although an LTE network architecture may be specified, those skilled in the art will recognize that the various concepts presented throughout this disclosure may be implemented in various types of access networks, other than the LTE network.

Figure 2:
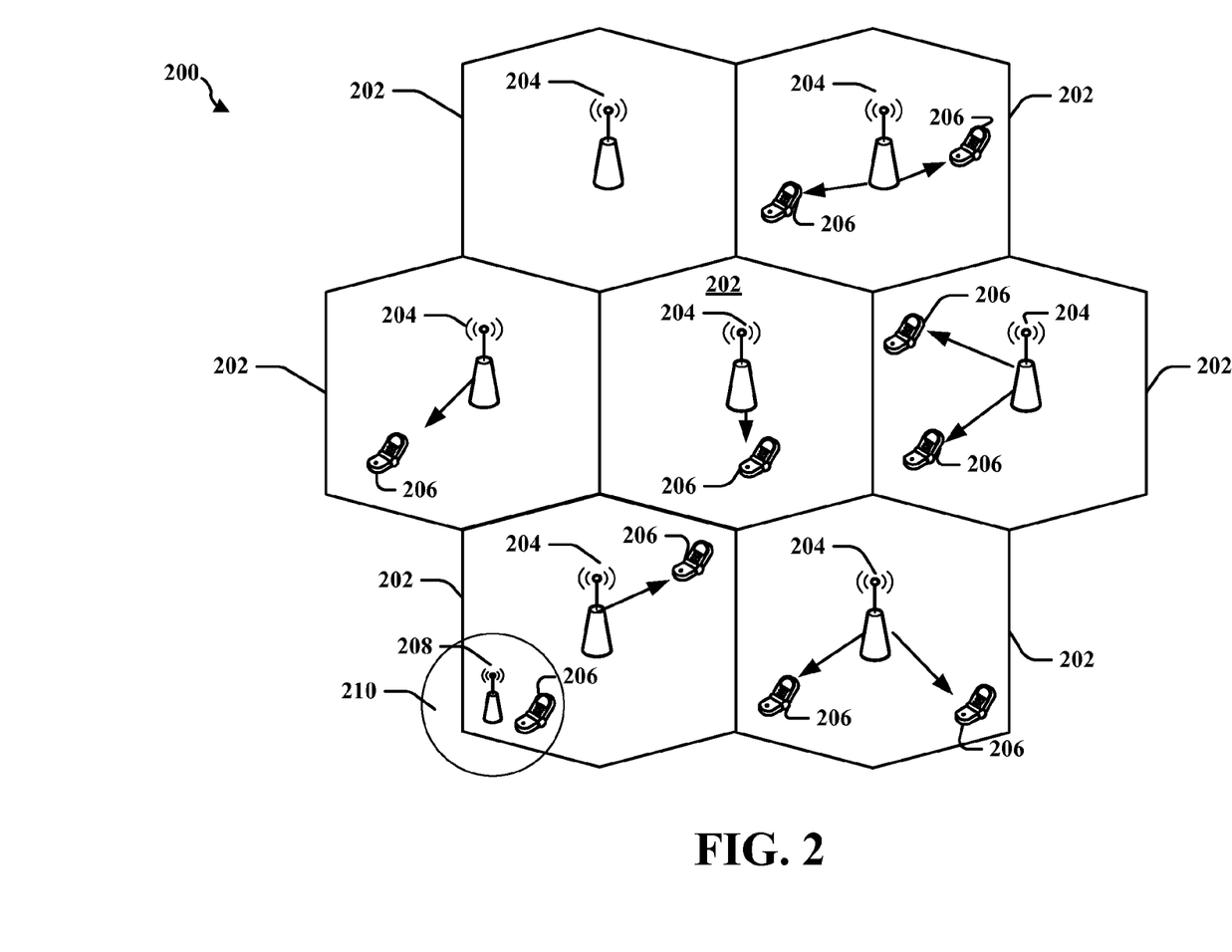
FIG. 2 is a diagram illustrating an example of an access network.

FIG. 2 is a diagram illustrating an example of an access network 200 in a network architecture. In this example, the access network 200 is divided into a number of cellular regions (cells) 202. One or more lower power class base stations 208 may have cellular regions 210 that overlap with one or more of the cells 202. The lower power class base station 208 may be a femto cell (e.g., home eNB (HeNB)), pico cell, micro cell, or remote radio head (RRH). The macro base stations 204 are each assigned to a respective cell 202 and are configured to provide an access point to a core network for all the UEs 206 in the cells 202. There is no centralized controller in this example of an access network 200, but a centralized controller may be used in alternative configurations. The base stations 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base station 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
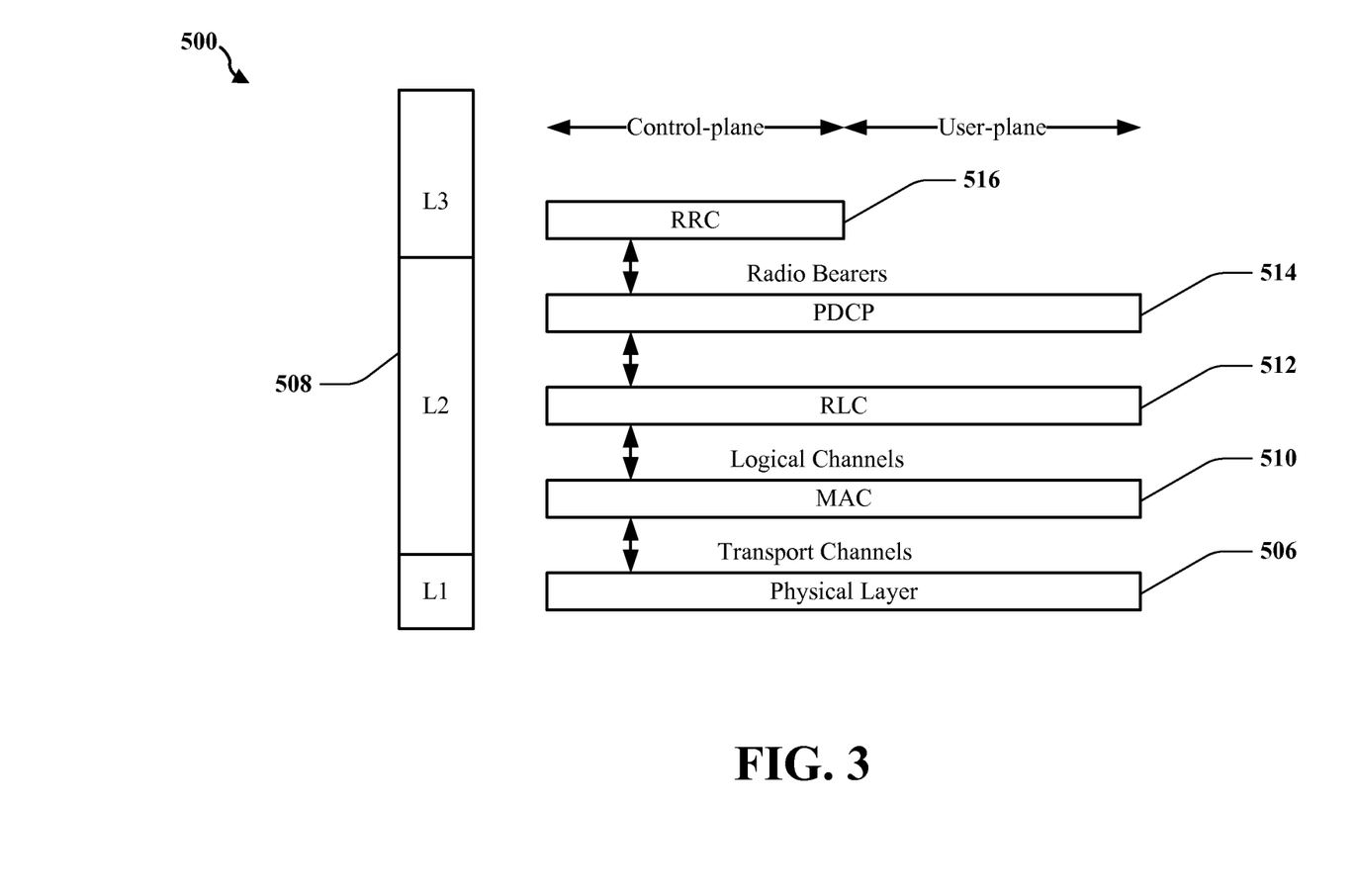
FIG. 3 is a diagram illustrating an example of a radio protocol architecture for the user and control planes.

FIG. 3 is a diagram 500 illustrating an example of a radio protocol architecture for the user and control planes. The radio protocol architecture for the UE and the base station is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and base station over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the base station on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 may provide header compression for upper layer data packets to reduce radio transmission overhead, security by ciphering the data packets, and handover support for UEs between base stations. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and base station is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for managing radio resources (i.e., radio bearers) and for configuring the lower layers using RRC signaling between the base station and the UE.

Figure 4:
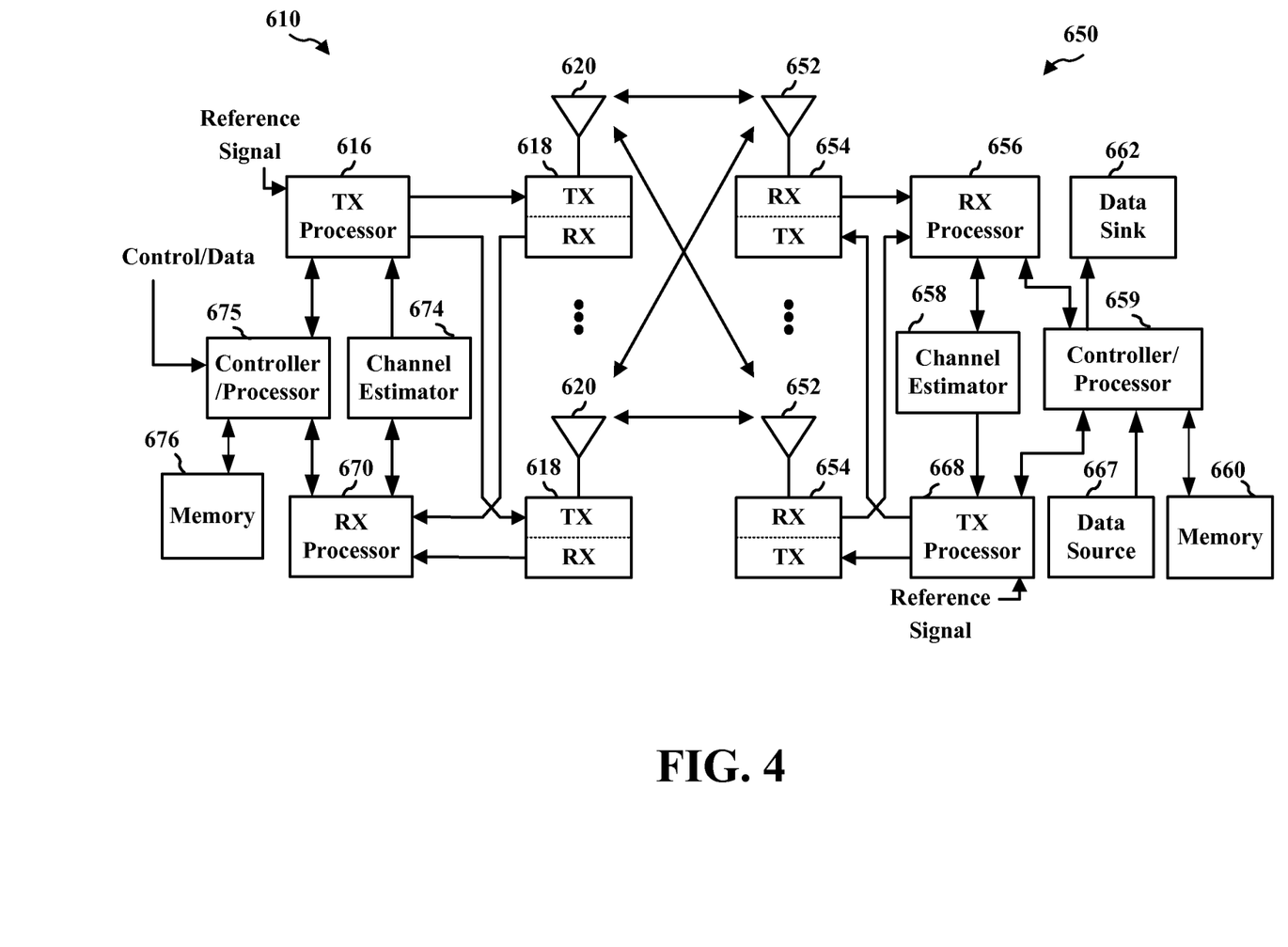
FIG. 4 is a diagram illustrating an example of a Node B and user equipment in an access network.

FIG. 4 is a block diagram of a base station 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In various wireless communication systems, a radio connection may use several states. For example, in a W-CDMA system in a lowest power state (e.g., idle state), a mobile terminal may receive small amounts of traffic, such as incoming pages. In a forward access channel (FACH) state, small amounts of data can be transferred on the uplink and downlink at the cost of slightly higher power consumption. For a high-rate data exchange, a dedicated channel (DCH) state may be used, where power consumption is highest. Radio network resources consumed in each state scale with the mobile terminal's power consumption. In addition, changing from one state to another consumes radio resources, as well as central processing unit (CPU) and memory resources, in a radio network controller (RNC) node. In an LTE system, an idle state and a connected state are provided. Within the connected state, substates such as "always on" and "discontinuous reception" are provided. Discontinuous reception may use various durations of a sleep cycle.

As long as no data needs to be exchanged between the mobile terminal and an access network, the mobile terminal may be kept in the idle state. When traffic needs to be sent, the mobile terminal may request a radio connection, and the access network may initiate the radio connection upon receiving the request. Alternatively, if the access network receives a packet destined for the mobile terminal while the mobile terminal is in the idle state, the access network may directly initiate the radio connection.

Traffic of an application running on the mobile terminal may be transported via a transport protocol, such as a user datagram protocol (UDP) or a transmission control protocol (TCP). These protocols may use sockets to send, connect, or bind a sender to a receiver. A socket is an endpoint of an inter-process communication flow across a network. Connections may be short-lived (e.g., a few seconds) or long-lived (e.g., hours or days).

TCP is a connection-oriented bidirectional transport protocol. Therefore, a TCP connection is initially created and acknowledged by both end hosts before traffic can be exchanged over the connection. Moreover, either end host may initiate a close of the connection by sending either a FIN packet or Reset (RST) packet, for example. Notably, the sending of the FIN packet shuts down the TCP connection in only one direction (from the perspective of the end host sending the FIN packet). Thus, the TCP connection in the opposite direction continues to exist until the other end host sends a similar FIN packet. Alternatively, the sending of the RST packet shuts down the TCP connection in both directions. Connections may exist forever. However, because connections consume host memory and require to be kept alive, end hosts may shut down a connection some time after the connection is no longer needed.

In certain wireless communication systems, the network controls the state of the mobile terminal. In particular, the network controls when the mobile terminal transitions from a higher power to a lower power state (dormancy). Typical network implementations use inactivity timers to decide when to initiate dormancy. For example, an inactivity timer may start or restart after a last burst of data is transmitted on the interface, either on the uplink or downlink. When the inactivity timer expires, a lower power state transition is initiated.

The selection of such inactivity timers is the result of a tradeoff between signaling overhead, terminal power, and network responsiveness. For instance, a very long dormancy timer may consume more radio resources and terminal power, but reduce the signaling overhead and latency. On the other hand, a very short dormancy timer may pre-maturely release a radio connection while a user is in the middle of browsing the Internet, resulting in the need to setup a new connection with associated delays and overhead. Inactivity timer values may vary according to implementation by a network operator. For example, an inactivity timer value in WCDMA DCH may be 15 seconds.

In order to let the mobile terminal participate in the selection of a radio state, the mobile terminal may be allowed to indicate when it no longer needs the radio connection. The indication may be provided via a signaling connection release indicator (SCRI). In response to receiving this message, the network may initiate transition to a lower power state. This procedure may also be referred to as Fast Dormancy (FD).

In general, from a user point of view, a mobile terminal is either active or in standby. While active, a terminal display screen is typically on, and the user may provide input via the touch screen, etc. While in standby, the display screen is typically off, and no user input is provided.

Various applications running on the mobile terminal while the mobile terminal is in standby may be studied to determine how the behavior of the applications impacts a radio connection between the mobile terminal and a radio access network. The running applications may include widgets and non-widgets. Widgets are generic types of software applications comprising portable code intended for one or more different software platforms. Widgets may allow a user to control simple utility functions such as clocks, messaging services, social networking services, weather stations, and calendars, for example. Moreover, widgets may be assumed to run in the background while non-widgets are not assumed to run in the background.

Figure 5A:
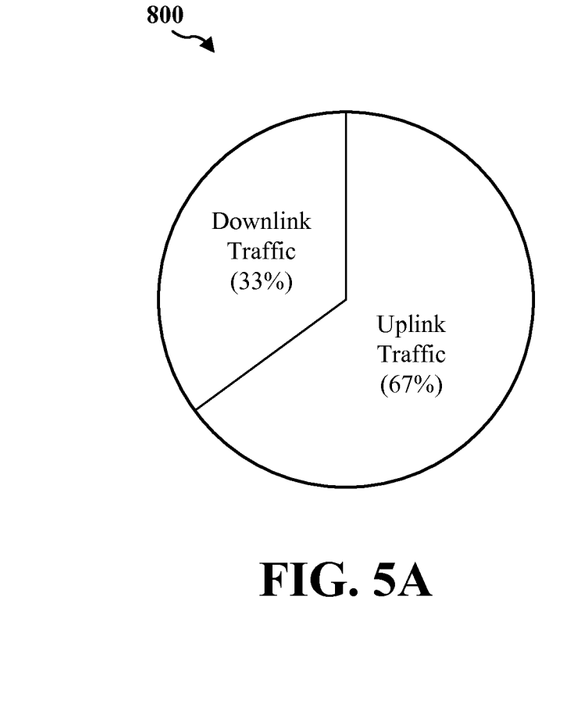
FIG. 5A is a diagram illustrating a percentage breakdown of how initiation of new RRC connections between a mobile terminal and a network may be attributed to uplink and downlink traffic.

FIG. 5A is a diagram 800 illustrating a percentage breakdown of how initiation of new RRC connections between a mobile terminal and a network may be attributed to uplink and downlink traffic. In the example of FIG. 5A, for a given set of applications running on the mobile terminal while the mobile terminal is in standby, 33% of radio connections between the mobile terminal and the network may be initiated due to the arrival of downlink data (i.e., the network sends data to the mobile terminal).

Figure 5B:
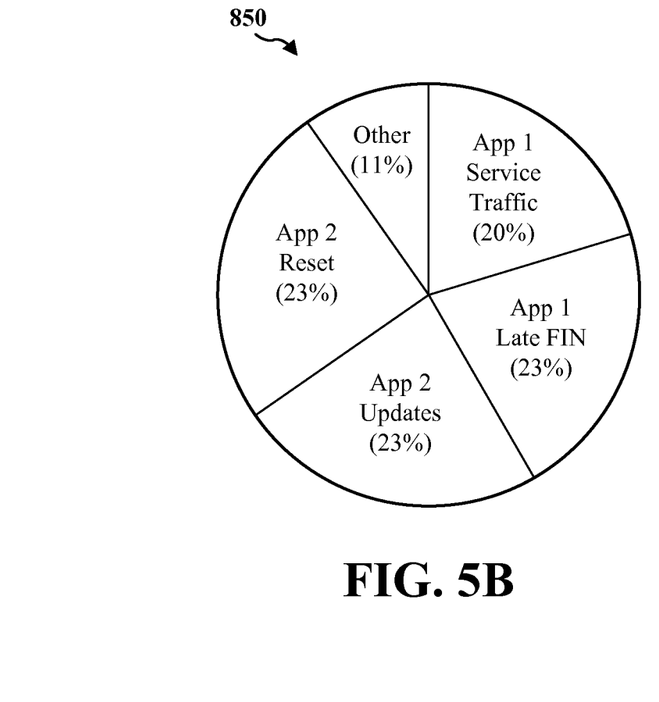
FIG. 5B is a diagram illustrating a percentage breakdown of the composition of downlink traffic that initiates radio connections between a mobile terminal and a network.

FIG. 5B is a diagram 850 illustrating a percentage breakdown of the composition of downlink traffic that initiates radio connections between the mobile terminal and the network. In the example of FIG. 5B, a late FIN packet from Application 1 and a Reset (RST) packet from Application 2 account for 46% of radio connections. Notably, the late FIN packet and Reset packet deliver no information to the user. These packets are merely used for tearing down a TCP connection between the mobile terminal and a server. If such packets were not sent, the downlink-initiated traffic may be reduced by 46%, which represents about 15% of the overall number of radio connections. Reducing the number of radio connections may be beneficial to the network due to reduced signaling and beneficial to the mobile terminal due to lower power consumption.

After a TCP connection is created between the mobile terminal and the server, and after traffic is exchanged between the two, the server may decide to shut down the TCP connection. Accordingly, a TCP FIN or RST packet may be sent from the server toward the mobile terminal for terminating the TCP connection. However, at this stage, a radio connection linking the access network to the mobile terminal may have already been terminated. Consequently, a new radio connection must be established for the sole purpose of transporting TCP signaling meant for tearing down the TCP connection. Hence, network resources, as well as mobile terminal resources (e.g., battery-life) are consumed with no benefit to the end user or system. Therefore, a method of managing the shutdown of TCP connections is considered, such that content-free traffic is eliminated. In an aspect of the disclosure, the number of downlink-initiated radio connections may be reduced by 46%, and the overall number of radio connections may be reduced by 15%. This yields significant power savings.

Not all TCP connections are closed by the server in an untimely fashion. Radio-aware developers may prefer to have the mobile terminal initiate the closure of the TCP connection early on when a radio connection is most likely still active or have the application server close the connection in a timely manner. However, there is a need for a mechanism to protect the network and the device in case applications repeatedly leave TCP connections open and let the server initiate closure of them later with the consequences explained above.

In an aspect of the disclosure, for the various applications running on a particular device (e.g., mobile terminal), it may be determined at run time, via a learning approach, which applications fail to timely close their TCP connection. Thereafter, early closure of the TCP connection on their behalf may be initiated.

Figure 6:
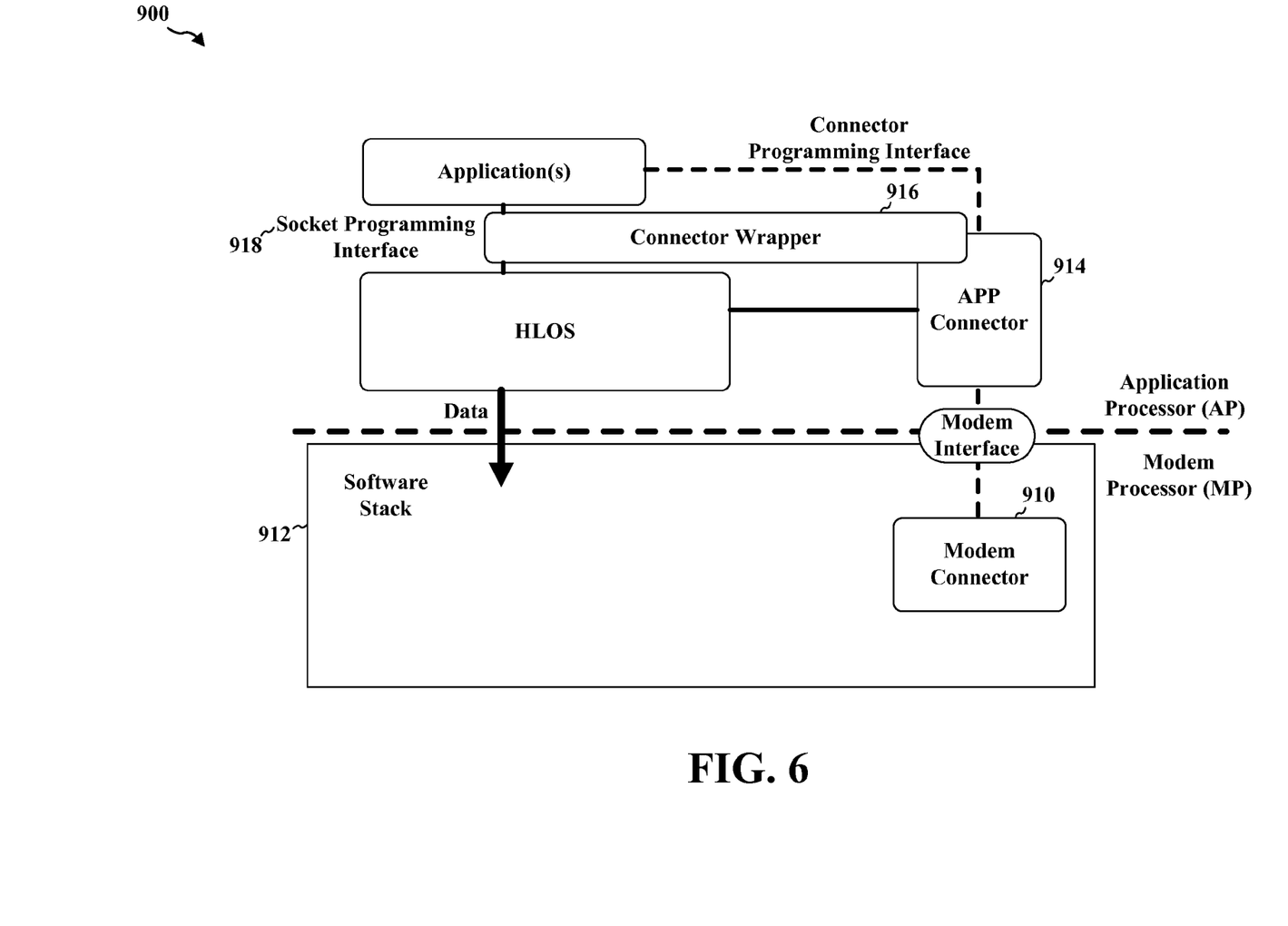
FIG. 6 is a diagram illustrating a software architecture implementing methods of the present disclosure.

FIG. 6 is a diagram 900 illustrating a software architecture implementing methods of the present disclosure. Referring to FIG. 6, a modem connector 910 is inserted in a modem software stack 912. The modem connector 910 includes information for the modem, such as a state of the radio connection (e.g., whether the radio connection is in Idle, FACH or DCH state for W-CDMA). The modem connector 910 may communicate with an application connector (APP connector) 914 running in a high level operating system (HLOS). The modem connector 910 may be able to associate TCP connections with an application using the TCP connections.

Still referring to FIG. 6, a connector wrapper 916 may operate with a socket programming interface 918 presented to the applications and the operating system. The connector wrapper 916 may retain a local copy of a currently opened socket. This allows the connector wrapper 916 to access and modify parameters associated with a TCP connection, such as a destination address, a port number, a protocol type, etc. In addition, the local copy of the currently opened socket allows the connector wrapper 916 to initiate shutdown of the TCP connection. Alternatively, such functionality may be embedded in the TCP/IP stack of the operating system, thus not requiring the use of a connection wrapper.

In an aspect, a set of sockets requiring intervention may be determined. A pathological closure of a TCP connection may arise when a server closes a TCP connection while a radio connection is inactive, and therefore prompts the activation of the radio connection to transport an associated TCP control message for closing the TCP connection. If the server closes the TCP connection while the radio connection is active, the closure is not pathological according to this disclosure. However, when the server closes the TCP connection while the radio connection is inactive, resources for re-activating the radio connection, or activating a new radio connection, may unnecessarily be consumed. Accordingly, a determination is made as to whether the TCP connection closure is a pathological closure to assess whether the resources used for re-activating the radio connection are wasted. As described below, the determination involves identifying which entity closed the TCP connection, and if the server closed the TCP connection, methods for determining that the TCP connection closure is pathological.

In an aspect, identifying which entity closes a TCP connection will be described. When the server initiates the closing of a TCP connection, the TCP connection enters a CLOSE_WAIT state. At this stage, the connector wrapper 916 may flag the socket. Later, as the socket is closed, the connector wrapper's copy of the socket is destroyed, and the connector wrapper may check the flag to determine which of the application or the server initiated the closing. If the flag is present, then it is determined that the server closed the TCP connection.

Notably, an opposite operation of flagging the socket when closure of the TCP connection is initiated by a client may be more difficult to implement. This is because either an application or a Linux kernel may initiate the TCP connection closure, either directly (e.g., via a close( ) command) or indirectly (e.g., via a dup( ) or dup2( ) command). Accordingly, the connector wrapper 916 may be required to monitor numerous socket call operations.

In an aspect, identifying a pathological socket closure will be described. A control message for closing the TCP connection may be received while a radio connection is active, in which case it is trouble free. Accordingly, a determination may be made as to whether the control message initiated the active radio connection.

For example, the modem connector 910 may determine, via the RRC protocol, whether a radio connection was initiated by uplink traffic or downlink traffic. If the modem connector 910 determines that the radio connection was initiated by downlink traffic, then the received control message for closing the TCP connection may be determined to initiate the radio connection. Alternatively, the modem connector 910 may communicate to the APP connector 914 a time at which the radio connection becomes available. Upon a socket being shut down, the connector wrapper 916 may compare a current time with the time at which the radio connection became available. If the current time is within hundreds of milliseconds of the time at which the radio connection became available, then the connector wrapper 916 may determine that the control message for closing the TCP connection initiated the radio connection. In a further alternative, the control message for closing the TCP connection may be determined to initiate the radio connection when a command to close the TCP connection is received from a higher layer at the client while the radio connection is not available.

In an aspect, some applications requiring long-lived sockets (e.g., push E-mail) may periodically close and immediately re-establish a TCP connection instead of sending a keep-alive message for an open connection. Hence, in such a situation, even though the server may close the TCP connection, the closure may not be considered a pathological socket closure needing intervention because a socket to the same destination and port is recreated shortly (i.e., within a predetermined amount of time) after the closure.

Accordingly, to determine whether a connection class is pathological, the modem connector 910 may tally a number of pathological socket closures for the sockets belonging to that connection class, and then determine whether the socket requires intervention based on the tally. For example, each time a socket copy is destroyed in the connector wrapper 916, the connector wrapper 916 may check a list of criteria to determine if the socket has pathologically closed. The criteria includes: 1) the server initiated the closure; 2) no similar TCP connection is created shortly (i.e., within a predetermined amount of time) after the TCP connection is closed; and 3) the transport layer control message (control packet) initiated the radio connection.

When all three criteria are met, the connector wrapper 916 increments a bad_socket counter for the connection class associated with that socket. The connection class may be defined by the connection's destination IP address, source or destination port, or host name associated with the destination IP address. Periodically (e.g., on a daily basis), the modem connector 910 may rank keys according to decreasing value of bad_socket counts. The connection classes having the most bad_socket counts have the worst impact on the radio connections. Thus, these connection classes make up the list of sockets determined to require intervention. In one aspect, software performs intervention on the worst N connection classes.

The sockets requiring intervention may be terminated early. In an aspect, the APP connector 914 and the modem connector 910 may coordinate with each other to estimate a time for releasing a radio connection. For example, the time for releasing the radio connection may be a time before dormancy is requested. Accordingly, sometime before the release, the APP connector 914 initiates an inspection of the sockets to identify whether any currently opened sockets require intervention. The socket will require intervention if: 1) the socket belongs to a pathological connection class; and 2) no traffic is exchanged over the socket for a predetermined amount of time.

For each socket that requires intervention, the APP connector 914 initiates a terminal-side closure of the TCP connection. As a result, the TCP connection will be shut down, thus eliminating the risk of the server later activating a radio connection for the sole purpose of closing the TCP connection.

Figure 7:
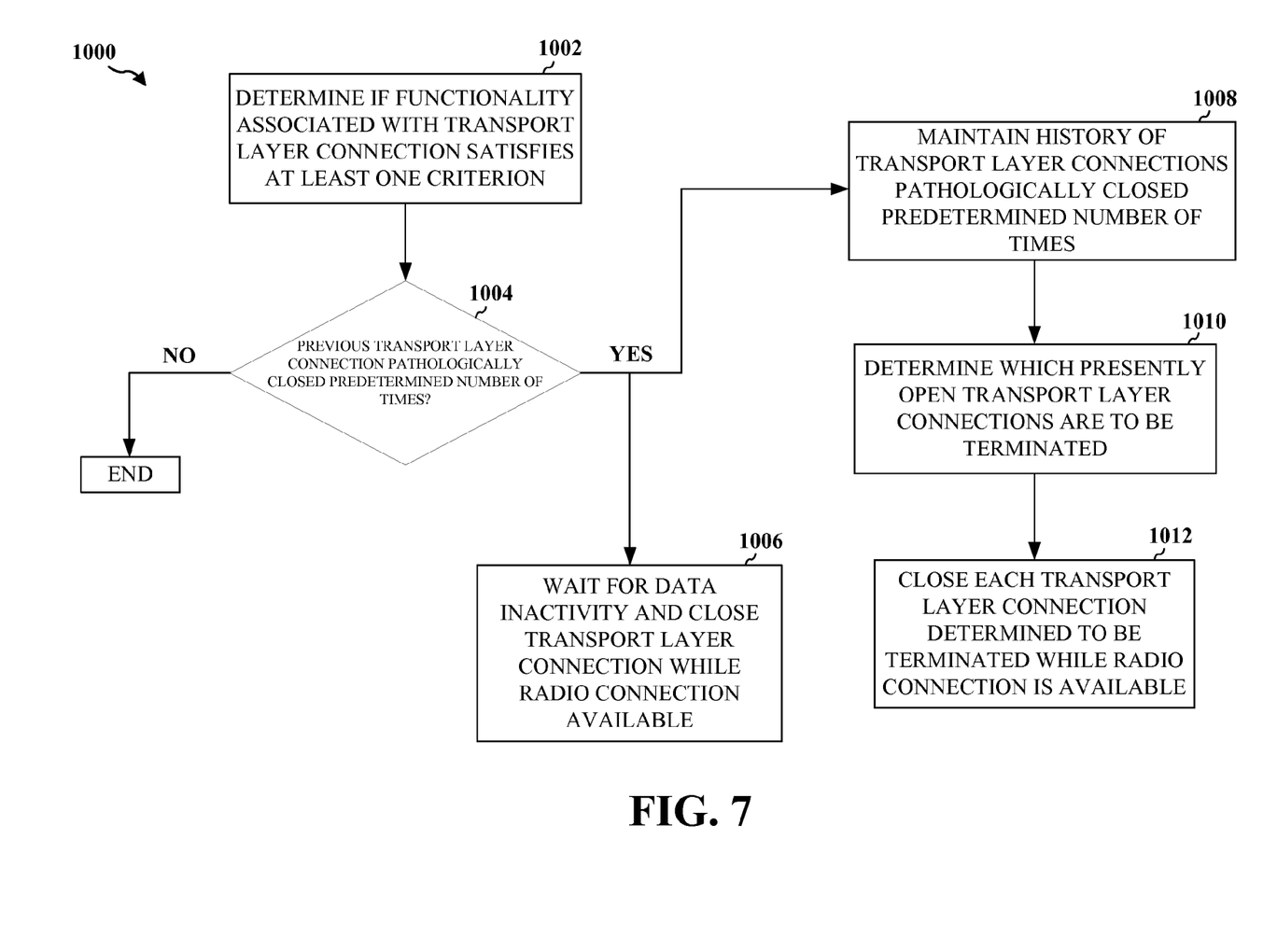
FIG. 7 is a flow chart of a method for initiating closure of a transport layer connection at a client.

FIG. 7 is a flow chart 1000 of a method for initiating closure of a transport layer connection/socket at a client. The method may be performed by a UE. At step 1002, the UE may determine whether a functionality associated with the transport layer connection/socket satisfies at least one criterion. For example, at step 1004, the UE may determine that the functionality satisfies the at least one criterion when a previous transport layer connection similar to the transport layer connection/socket is previously pathologically closed a predetermined number of times.

The previous transport layer connection may be determined pathologically closed if the following conditions are satisfied: 1) another transport layer connection similar to the previous transport layer connection is not created shortly (i.e., within a predetermined amount of time) after the closing of the previous transport layer connection; and 2) a control message for closing the previous transport layer connection initiated a radio layer connection. The control message for closing the previous transport layer connection is determined to initiate the radio layer connection when the radio layer connection is initiated by downlink traffic, a time at which the previous transport layer connection is closed is near a time at which the radio layer connection is initially available, or a command to close the previous transport layer connection is received from a higher layer at the client while a radio layer connection is not available. Accordingly, when the functionality associated with the transport layer connection/socket satisfies the at least one criterion, the connection/socket may be determined to belong to an identified pathological connection class.

At step 1006, the UE waits for data inactivity on the transport layer connection/socket and may thereafter close the transport layer connection/socket belonging to the identified pathological connection class while the radio layer connection is available. Particularly, the UE may close the transport layer connection/socket upon determining that the previous transport layer connection is to be terminated. For example, the previous transport layer connection is determined to be terminated when no traffic is exchanged over the previous transport layer connection for a predetermined amount of time.

At step 1008, after determining that the previous transport layer connection is pathologically closed the predetermined number of times (step 1004), the UE may maintain a history of transport layer connections that are pathologically closed a number of times. At step 1010, the UE may determine which of the presently open transport layer connections having a match in the history are to be terminated. Thereafter, at step 1012, the UE may close each presently open transport layer connection that is determined to be terminated while the radio connection is still available. In an aspect, a transport layer connection having a match in the history may be determined to be terminated when a destination address or port or host name of the transport layer connection is present in the history and when no traffic is exchanged over the transport layer connection for a predetermined amount of time.

Figure 8:
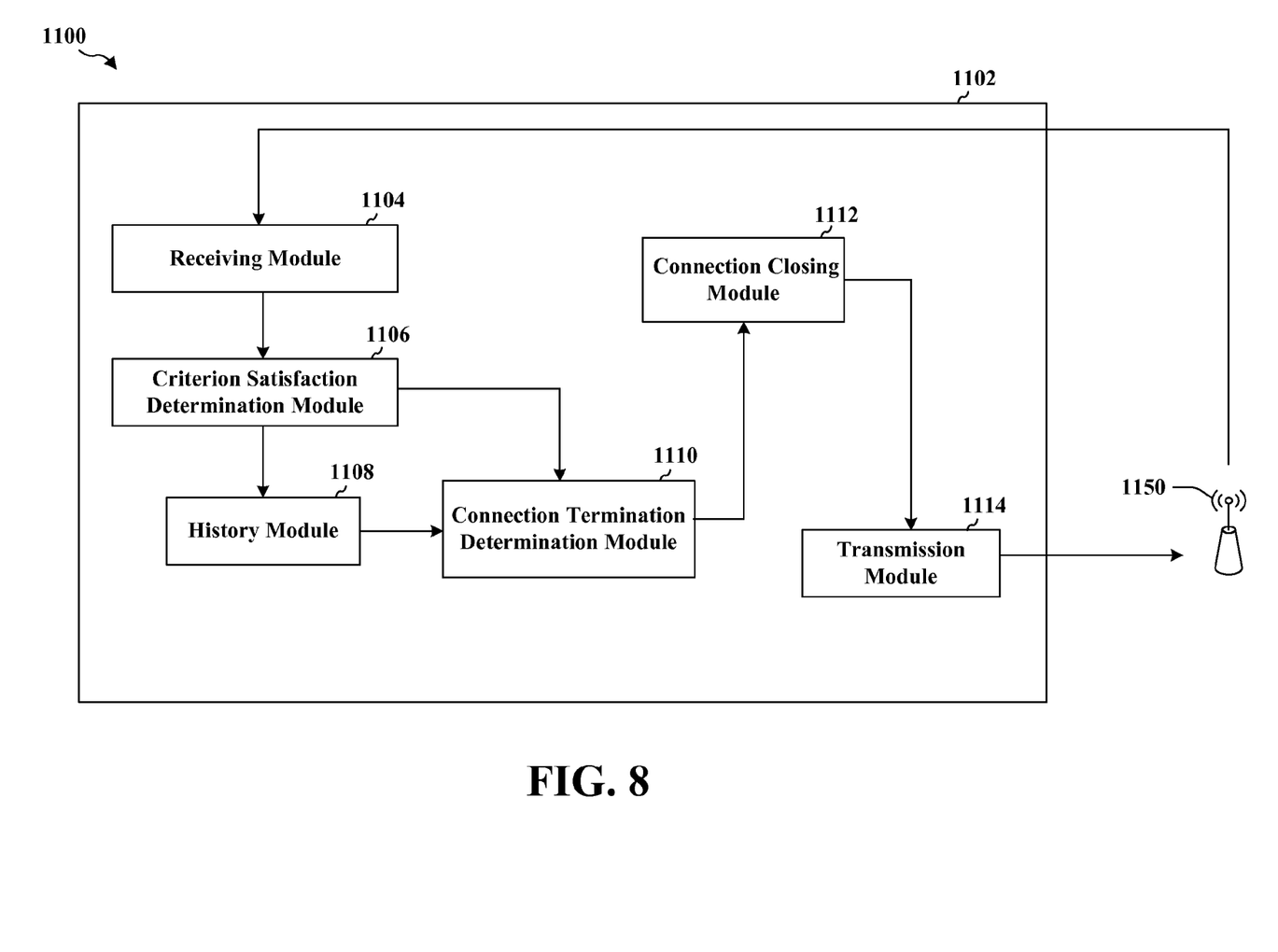
FIG. 8 is a conceptual data flow diagram illustrating the data flow between different modules/means/components in an exemplary apparatus.

FIG. 8 is a conceptual data flow diagram 1100 illustrating the data flow between different modules/means/components in an exemplary apparatus 1102. The apparatus may be a UE communicating with a base station 1150. The apparatus includes a receiving module 1104, a criterion satisfaction determination module 1106, a history module 1108, a connection determination module 1110, a connection closing module 1112, and a transmission module 1114.

The criterion satisfaction determination module 1106 may determine whether a functionality associated with a transport layer connection/socket satisfies at least one criterion. For example, the criterion satisfaction determination module 1106 may determine that the functionality satisfies the at least one criterion when a previous transport layer connection similar to the transport layer connection/socket is previously pathologically closed a predetermined number of times.

The criterion satisfaction determination module 1106 may determine the previous transport layer connection pathologically closed if the following conditions are satisfied: 1) another transport layer connection similar to the previous transport layer connection is not created shortly (i.e., within a predetermined amount of time) after the closing of the previous transport layer connection; and 2) a control message, received by the receiving module 1104, for closing the previous transport layer connection initiated a radio layer connection. Furthermore, the criterion satisfaction determination module 1106 may determine that the control message for closing the previous transport layer connection initiated the radio layer connection when the radio layer connection is initiated by downlink traffic, a time at which the previous transport layer connection is closed is near a time at which the radio layer connection is initially available, or a command to close the previous transport layer connection is received from a higher layer at the UE while a radio layer connection is not available. Accordingly, when the functionality associated with the transport layer connection/socket satisfies the at least one criterion, the connection/socket may be determined to belong to an identified pathological connection class.

The connection closing module 1112 may wait for data inactivity on the transport layer connection/socket and may thereafter close the transport layer connection/socket belonging to the identified pathological connection class while the radio layer connection is available. Particularly, the connection closing module 1112 may close the transport layer connection/socket upon the criterion satisfaction determination module 1106 determining that the previous transport layer connection is to be terminated. For example, the previous transport layer connection is determined to be terminated when no traffic is exchanged over the previous transport layer connection for a predetermined amount of time.

After the criterion satisfaction determination module 1106 determines that the previous transport layer connection is pathologically closed the predetermined number of times, the history module 1108 may maintain a history of transport layer connections that are pathologically closed a number of times. The connection termination determination module 1110 may determine which of the presently open transport layer connections having a match in the history are to be terminated. Thereafter, the connection closing module 1112 may close each presently open transport layer connection that is determined by the connection termination determination module 1110 to be terminated while the radio connection is still available. In an aspect, the connection termination determination module 1110 may determine to terminate a transport layer connection having a match in the history when a destination address or port or host name of the transport layer connection is present in the history and when no traffic is exchanged over the transport layer connection for a predetermined amount of time.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
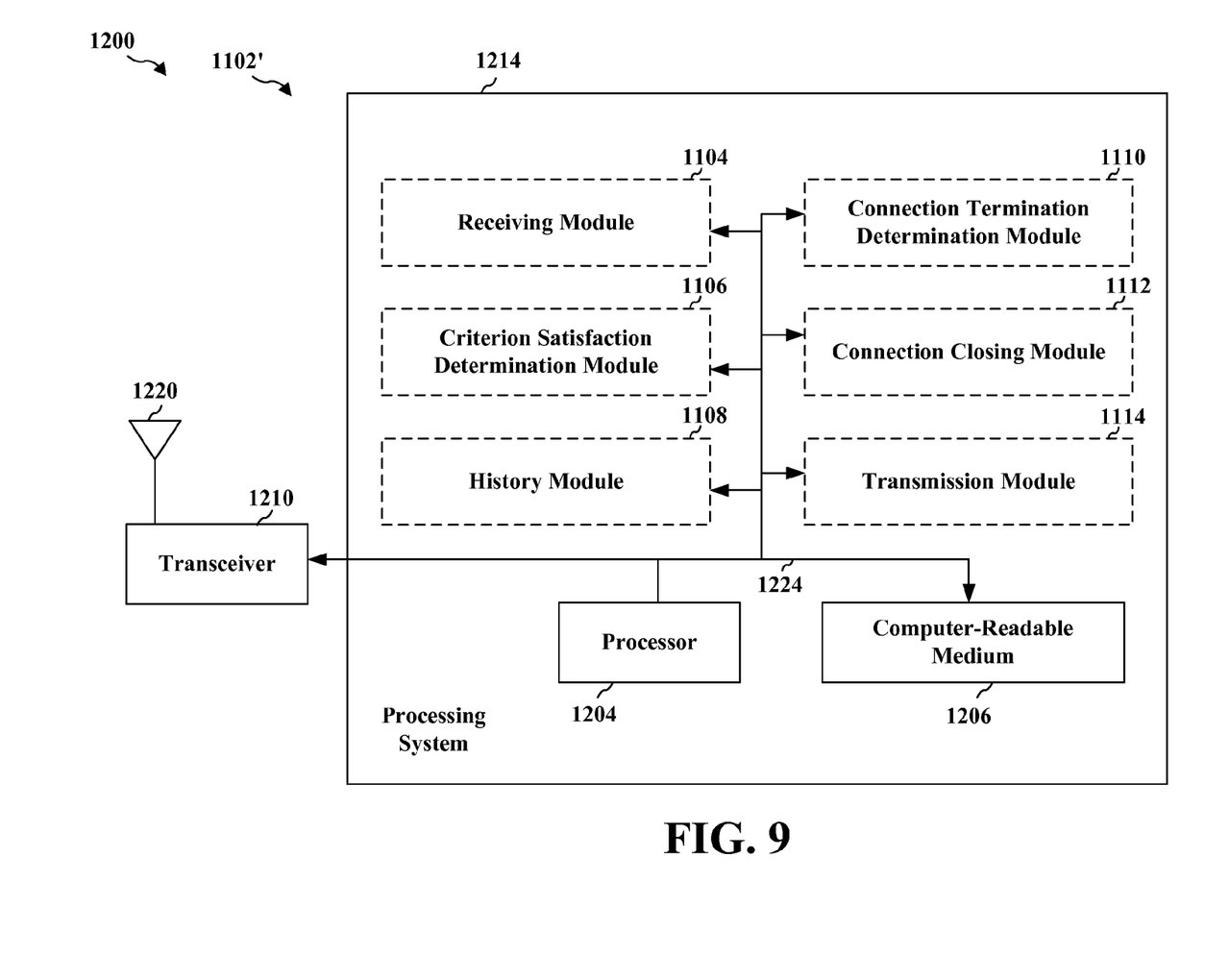
FIG. 9 is a diagram illustrating an example of a hardware implementation for an apparatus employing a processing system.

FIG. 9 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1112, and 1114. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for determining whether a functionality associated with the transport layer connection satisfies at least one criterion, means for closing the transport layer connection when the functionality satisfies the at least one criterion while a radio layer connection is available, means for maintaining a history of transport layer connections that are pathologically closed a predetermined number of times, means for determining which presently open transport layer connections having a match in the history are to be terminated, and means for closing each presently open transport layer connection that is determined to be terminated.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for initiating a closing of a current transport layer connection utilized by an application at a client, comprising:
   determining whether a predetermined number of previous transport layer connections that were utilized by the application prior to the current transport layer connection were pathologically closed, the predetermined number being an integer greater than 0;
   detecting data inactivity on the current transport layer connection; and
   closing the current transport layer connection based on detecting the data inactivity and determining that the predetermined number of previous transport layer connections were pathologically closed while a radio layer connection is available.

2. The method of claim 1, wherein a given one of the previous transport layer connections is pathologically closed when at least one of the following conditions is met:
   another transport layer connection is not created within a predetermined amount of time after the closing of the given one previous transport layer connection; or
   a control message for closing the given one previous transport layer connection initiated a radio layer connection.

3. The method of claim 2, wherein the control message for closing the given one previous transport layer connection is determined to initiate the radio layer connection when:
   the radio layer connection is initiated by downlink traffic;
   a time at which the transport layer connection is closed is near a time at which the radio layer connection is initially available; or
   a command to close the previous transport layer connection is received from a higher layer at the client while the radio layer connection is not available.

4. The method of claim 1, wherein:
   a given one of the previous transport layer connections is pathologically closed when the given one previous transport layer connection is determined to be terminated.

5. The method of claim 4, wherein the given one previous transport layer connection is determined to be terminated when no traffic is exchanged over the previous transport layer connection for a predetermined amount of time.

6. A method for initiating a closing of a transport layer connection at a client, comprising:
   determining whether a functionality associated with the transport layer connection satisfies at least one criterion;
   closing the transport layer connection when the functionality satisfies the at least one criterion while a radio layer connection is available, wherein the functionality satisfies the at least one criterion when a previous transport layer connection similar to the transport layer connection is previously pathologically closed a predetermined number of times;
   maintaining a history of transport layer connections that are pathologically closed a number of times;
   determining which presently open transport layer connections having a match in the history are to be terminated; and
   closing each presently open transport layer connection that is determined to be terminated.

7. The method of claim 6, wherein a transport layer connection having a match in the history is determined to be terminated when:
   a destination address or port or host name of the transport layer connection is in the history; and
   no traffic is exchanged over the transport layer connection for a predetermined amount of time.

8. An apparatus for initiating a closing of a current transport layer connection utilized by an application, comprising:
   means for determining whether a predetermined number of previous transport layer connections that were utilized by the application prior to the current transport layer connection were pathologically closed, the predetermined number being an integer greater than 0;
means for detecting data inactivity on the current transport layer connection; and
means for closing the current transport layer connection based on detecting the data inactivity and determining that the predetermined number of previous transport layer connections were pathologically closed while a radio layer connection is available.

9. The apparatus of claim 8, wherein a given one of the previous transport layer connections is pathologically closed when at least one of the following conditions is met:
another transport layer connection is not created within a predetermined amount of time after the closing of the given one previous transport layer connection; or
a control message for closing the given one previous transport layer connection initiated a radio layer connection.

10. The apparatus of claim 9, wherein the control message for closing the given one previous transport layer connection is determined to initiate the radio layer connection when:
the radio layer connection is initiated by downlink traffic;
a time at which the transport layer connection is closed is near a time at which the radio layer connection is initially available; or
a command to close the previous transport layer connection is received from a higher layer at the apparatus while the radio layer connection is not available.

11. The apparatus of claim 8, wherein:
a given one of the previous transport layer connections is pathologically closed when the given one previous transport layer connection is determined to be terminated.

12. The apparatus of claim 11, wherein the given one previous transport layer connection is determined to be terminated when no traffic is exchanged over the previous transport layer connection for a predetermined amount of time.

13. An apparatus for initiating a closing of a transport layer connection, comprising:
means for determining whether a functionality associated with the transport layer connection satisfies at least one criterion;
means for closing the transport layer connection when the functionality satisfies the at least one criterion while a radio layer connection is available, wherein the functionality satisfies the at least one criterion when a previous transport layer connection similar to the transport layer connection is previously pathologically closed a predetermined number of times;
means for maintaining a history of transport layer connections that are pathologically closed a number of times;
means for determining which presently open transport layer connections having a match in the history are to be terminated; and
means for closing each presently open transport layer connection that is determined to be terminated.

14. The apparatus of claim 13, wherein a transport layer connection having a match in the history is determined to be terminated when:
a destination address or port or host name of the transport layer connection is in the history; and
no traffic is exchanged over the transport layer connection for a predetermined amount of time.

15. An apparatus for initiating a closing of a current transport layer connection utilized by an application, comprising:
a processing system configured to:
determine whether a predetermined number of previous transport layer connections that were utilized by the application prior to the current transport layer connection were pathologically closed, the predetermined number being an integer greater than 0;
detect data inactivity on the current transport layer connection; and
close the current transport layer connection based on detecting the data inactivity and determining that the predetermined number of previous transport layer connections were pathologically closed while a radio layer connection is available.

16. The apparatus of claim 15, wherein a given one of the previous transport layer connections is pathologically closed when at least one of the following conditions is met:
another transport layer connection is not created within a predetermined amount of time after the closing of the given one previous transport layer connection; or
a control message for closing the given one previous transport layer connection initiated a radio layer connection.

17. The apparatus of claim 16, wherein the control message for closing the given one previous transport layer connection is determined to initiate the radio layer connection when:
the radio layer connection is initiated by downlink traffic;
a time at which the transport layer connection is closed is near a time at which the radio layer connection is initially available; or
a command to close the previous transport layer connection is received from a higher layer at the apparatus while the radio layer connection is not available.

18. The apparatus of claim 15, wherein:
a given one of the previous transport layer connections is pathologically closed when the given one previous transport layer connection is determined to be terminated.

19. The apparatus of claim 18, wherein the given one previous transport layer connection is determined to be terminated when no traffic is exchanged over the previous transport layer connection for a predetermined amount of time.

20. An apparatus for initiating a closing of a transport layer connection, comprising:
a processing system configured to:
determine whether a functionality associated with the transport layer connection satisfies at least one criterion;
close the transport layer connection when the functionality satisfies the at least one criterion while a radio layer connection is available, wherein the functionality satisfies the at least one criterion when a previous transport layer connection similar to the transport layer connection is previously pathologically closed a predetermined number of times;
maintain a history of transport layer connections that are pathologically closed a number of times;
determine which presently open transport layer connections having a match in the history are to be terminated; and
close each presently open transport layer connection that is determined to be terminated.

21. The apparatus of claim 20, wherein a transport layer connection having a match in the history is determined to be terminated when:
a destination address or port or host name of the transport layer connection is in the history; and
no traffic is exchanged over the transport layer connection for a predetermined amount of time.

22. A non-transitory computer-readable medium comprising code for:
determining whether a predetermined number of previous transport layer connections that were utilized by the application prior to the current transport layer connection were pathologically closed, the predetermined number being an integer greater than 0;

detecting data inactivity on the current transport layer connection; and closing the current transport layer connection based on detecting the data inactivity and determining that the predetermined number of previous transport layer connections were pathologically closed while a radio layer connection is available.

23. The non-transitory computer-readable medium of claim 22, wherein a given one of the previous transport layer connections is pathologically closed when at least one of the following conditions is met:

another transport layer connection is not created within a predetermined amount of time after the closing of the given one previous transport layer connection; or a control message for closing the given one previous transport layer connection initiated a radio layer connection.

24. The non-transitory computer-readable medium of claim 23, wherein the control message for closing the given one previous transport layer connection is determined to initiate the radio layer connection when:

the radio layer connection is initiated by downlink traffic;

a time at which the transport layer connection is closed is near a time at which the radio layer connection is initially available; or a command to close the previous transport layer connection is received from a higher layer at the client while the radio layer connection is not available.

25. The non-transitory computer-readable medium of claim 22, wherein:

a given one of the previous transport layer connections is pathologically closed when the given one previous transport layer connection is determined to be terminated.

26. The non-transitory computer-readable medium of claim 25, wherein the given one previous transport layer connection is determined to be terminated when no traffic is exchanged over the previous transport layer connection for a predetermined amount of time.

27. A non-transitory computer-readable medium comprising code for:

determining whether a functionality associated with the transport layer connection satisfies at least one criterion;

closing the transport layer connection when the functionality satisfies the at least one criterion while a radio layer connection is available, wherein the functionality satisfies the at least one criterion when a previous transport layer connection similar to the transport layer connection is previously pathologically closed a predetermined number of times;

maintaining a history of transport layer connections that are pathologically closed a number of times;

determining which presently open transport layer connections having a match in the history are to be terminated; and closing each presently open transport layer connection that is determined to be terminated.

28. The non-transitory computer-readable medium of claim 27, wherein a transport layer connection having a match in the history is determined to be terminated when:

a destination address or port or host name of the transport layer connection is in the history; and no traffic is exchanged over the transport layer connection for a predetermined amount of time.

* * * * *